United States Patent [19]

Hutson, Jr.

[11] Patent Number: 4,733,099

[45] Date of Patent: Mar. 22, 1988

[54] MAGNETIC PROPULSION POWER PLANT

[76] Inventor: William O. Hutson, Jr., Rte. 3, Box 18B, Magnolia, Miss. 39652

[21] Appl. No.: 46,235

[22] Filed: May 4, 1987

Related U.S. Application Data

[63] Continuation-in-part of Ser. No. 657,721, Apr. 1, 1985.

[51] Int. Cl.⁴ ............................................. H02K 47/00
[52] U.S. Cl. ...................... 290/1 R; 290/49; 310/118
[58] Field of Search .................. 290/1 R, 12, 15, 20, 290/23, 49; 310/46, 49 R, 115, 118; 318/690

[56] References Cited

U.S. PATENT DOCUMENTS

| | | | |
|---|---|---|---|
| 1,834,639 | 12/1931 | Pedrazzo | 318/690 |
| 1,889,208 | 11/1932 | Hasterson et al. | 310/118 X |
| 3,187,244 | 6/1965 | Summerer | 318/690 X |
| 4,266,180 | 5/1981 | Juvan | 290/1 R X |
| 4,357,551 | 11/1982 | Dulondel | 310/46 |
| 4,526,007 | 7/1985 | Smith | 310/46 X |

*Primary Examiner*—William M. Shoop, Jr.
*Assistant Examiner*—W. E. Duncanson, Jr.
*Attorney, Agent, or Firm*—James M. Pelton

[57] ABSTRACT

A magnetically driven generator/motor for producing singly or simultaneously mechanical and electrical energy outputs, having a housing including circular frame members with electromagnet drivers about corresponding driven magnets attached to at least one rotating stage fixed to a drive shaft and also carrying field coils, at least one counter rotating stage, bearing mounted to the drive shaft with peripheral driven magnets and armatures which produce electricity when rotated past the field coils.

18 Claims, 6 Drawing Figures

MAGNETIC PROPULSION POWER PLANT

CROSS-REFERENCE TO RELATED APPLICATION

This application is a continuation-in-part of application Ser. No. 657,721, filed Apr. 1, 1985, now pending.

BACKGROUND OF THE INVENTION

This invention relates to a power plant or motor which is capable of producing either singly or simultaneously electric or mechanical power outputs. The power plant is driven magnetically and the magnetic drive is energized by a power source, preferably a battery.

Although electric motors or generators are known and conventional and employ the field coil and armature to generate mechanical or electrical output, it is not believed known to generate both mechanical and electrical energy outputs from the same motor/generator or to do so with higher electrical output for a given rotation of the field coils. It is known, for example, that direct-current (DC) machines, either generators or motors-a generator is a rotating machine that transforms mechanical to electrical energy and a motor is a rotating machine which transforms electrical to mechanical energy-have operating characteristics based on the following facts: (a) a conductor moved through a transverse magnetic field has a voltage induced in it. The magnitude of the voltage is dependent upon the strength of the field and the velocity of the conductor with respect to the field; and (b) a current carrying conductor in a transverse magnetic field has a force exerted upon it. The magnitude of the force is dependent upon the strength of the field and the magnitude of the current. It has always been a desire of the generator/motor art to provide for more efficient and effective machines. It has been an industry goal to improve the DC generator/motor machines so that more effective work can be accomplished by a given amount of initial energy in a power source. Even though frictional and electrical losses occur so that all of the energy input cannot be recovered, and certainly an amount of energy greater than that input cannot be obtained, it is desirable to provide alternative generator/motor configurations which advantageously employ known concepts to provide a combination of novel and unobvious features which result in an improved power plant. Such a development is provided by the magnetic propulsion power plant of my invention.

THE INVENTION

As indicated, my invention provides a magnetic propulsion power plant providing both mechanical and electrical power output which comprises in combination (a) housing means including a front cover means and a back cover means, both of said cover means having centrally located bearing means and having connecting members which connect said cover means; (b) at least two peripheral frame members between said cover means and attached to said connecting members, said frame members each having at least one electromagnetic drive means located thereon; (c) a DC power source electrically connected to said electromagnetic drive means; (d) a drive shaft bearing mounted in said bearing means and extending between said front and said back cover means and outwardly of one of said cover means; (e) at least one electromagnetically driven stage fixedly attached to said drive shaft for rotation thereof about the central longitudinal axis of said drive shaft and in registry with one of said at least two peripheral frame members, said fixed stage having at least one dynamically balanced magnetic element located adjacent the periphery of said fixed stage and in proximate driven relation to said electromagnetic drive means during the rotation of said fixed stage and having at least one dynamically balanced electromagnetic field generating coil means adjacent said central axis and electrically connected to said power source; (f) at least one electromagnetically driven stage bearing mounted on said drive shaft for rotation thereof about said central axis and in registry with the other of said at least two frame members, said bearing mounted driven stage having at least one dynamically balanced magnetic element located adjacent the periphery of said bearing-mounted stage and in proximate driven relation to said electromagnetic drive means for being driven in counter rotation to the rotation of said fixed stage, and at least one dynamically balanced armature means adjacent said central axis and electrically connected to a suitable receiver for electrical power generated in said armature; and (g) a timing and firing assembly electrically connected to said DC power source and said electromagnetic drive means, so that activation of said timing and firing assembly intermittently energizes said electromagnetic drive means in the sequence and with the polarity required to initiate and sustain rotation of said fixed stage and counterrotation of said bearing mounted stage and provide thereby for the simultaneous rotation of said drive shaft for mechanical power and for electrical power at a level greater than that expected from the rotational speed of said fixed and said bearing mounted stages.

DRESCRIPTION OF THE DRAWINGS

The Figures of the drawings, attached hereto and made a part hereof, illustrate a preferred embodiment of my invention. Like numbers refer to the same parts throughout. The Figures are illustrative only, and the preferred embodiment shown is not limiting. In the drawings, the invention is represented as follows.

DETAILED DESCRIPTION OF PREFERRED EMBODIMENTS

Figure 1:
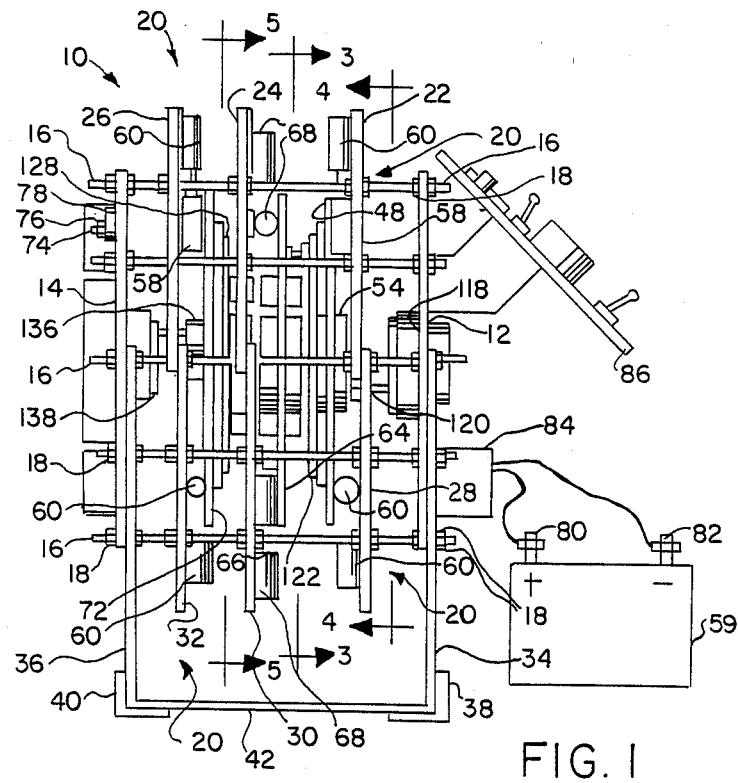
FIG. 1 is a side view of a preferred embodiment of my invention.
Figure 2:
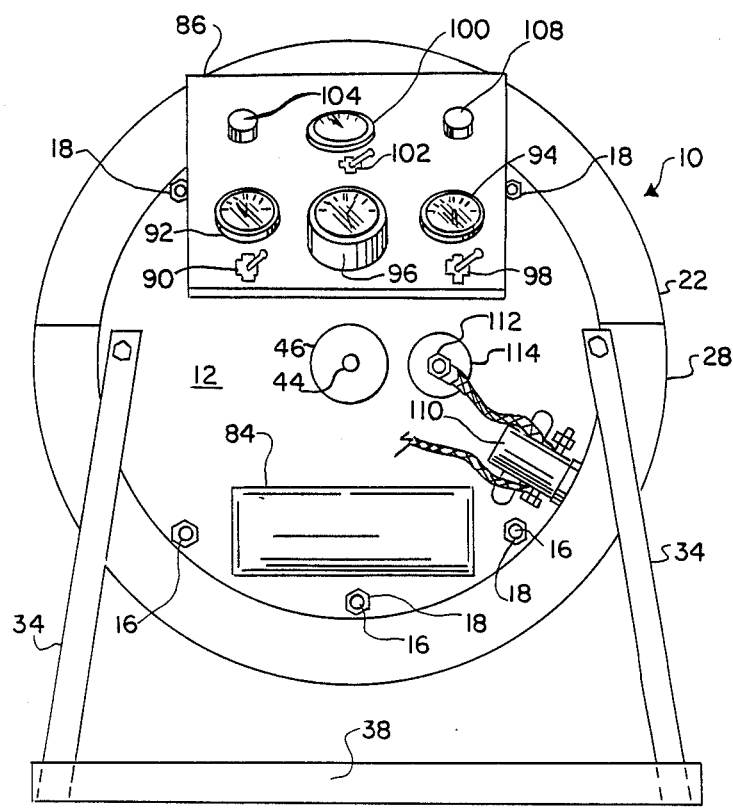
FIG. 2 is a front view of the preferred power plant of my invention, showing the instrument panel therefor.
Figure 6:
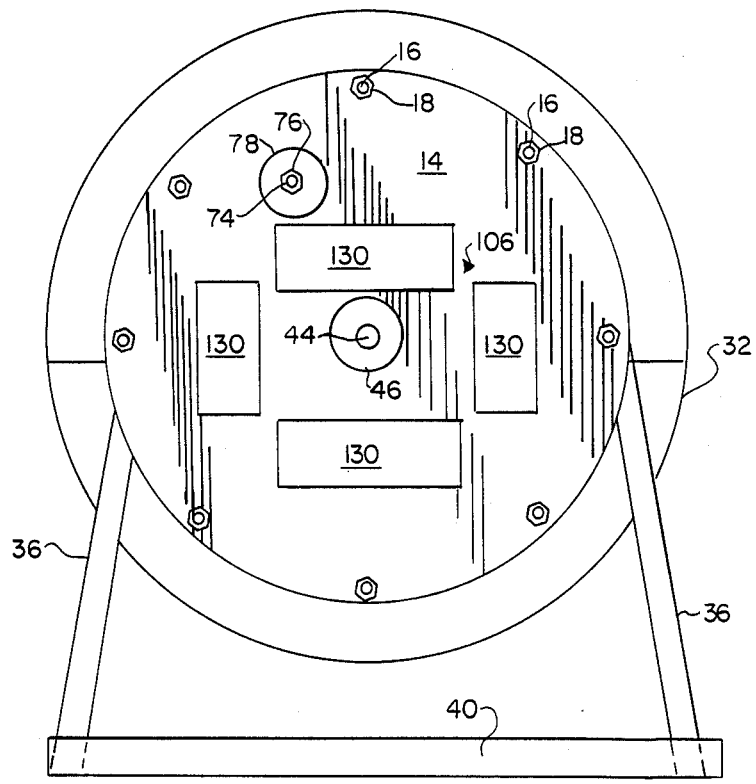
FIG. 6 is a rear view of the propulsion plant of my invention.

Referring to FIG. 1, the magnetic propulsion power plant, generally referred to by the numeral 10, has two end plates specifically, front end plate 12 and rear end plate 14, of generally circular shape and being relatively thin and flat, although the configuration is not critical and can be of any desired shape. End plates 12 and 14 are held together by threaded bolts 16, of which eight are illustrated; however, a greater or lesser number may be used as desired. Nuts 18 threaded on bolts 16 are used to hold various members in position. Also, attached to bolts 16 and held in spaced apart relation are a series of frame members 20, which are divided for convenience of assembly and maintenance into a group of upper frame members 22, 24 and 26, and lower frame members 28, 30, and 32, respectively, for the first, second and third propulsion stages of my invention. It should be pointed out that the power plant illustrated contains three propulsion stages, but suitable magnetic propulsion power plants according to my invention can contain two, three, four or more stages and will have the corresponding power characteristics depending on the number, size, and type of stages; the number and power of the drive means; and the type of generating means employed. As illustrated in FIG. 1, the upper and lower frame members 22, 24, 26, 28, 30 and 32 are relatively flat circular members similar to end plates 12 and 14, but shapes having the central area removed forming a flat semi-toroid shape, which upon connection of the corresponding upper and lower forms the completed toroidal framework of the power plant of my invention. The framework is supported by front and rear frame support members 34 and 36, which are connected to front and rear end plates 12 and 14 by two of bolts 16 and nuts 18 and are additionally supported by connection to front and rear base supports 38 and 40, and lateral base supports 42. The framework of my magnetic propulsion power plant 10 can be supported by any appropriate means such as vibration damping motor mounts or even from above, as desired. FIGS. 1, 2 and 6 merely illustrate a convenient means to maintain the power plant relatively still, off the ground or other support surface and allow access to its components.

The framework and all other parts are of non-magnetic materials, except as noted herein below. Preferably, the structural parts are of aluminum with brass fittings. However, the use of other non-magnetic materials, such as engineering thermoplastics, composites, ceramics or graphite and the like are certainly within the ambit of my invention. The importance of the non-magnetic structural materials will be self-evident from the further description of the magnetic drive means for my invention described below.

Figure 5:
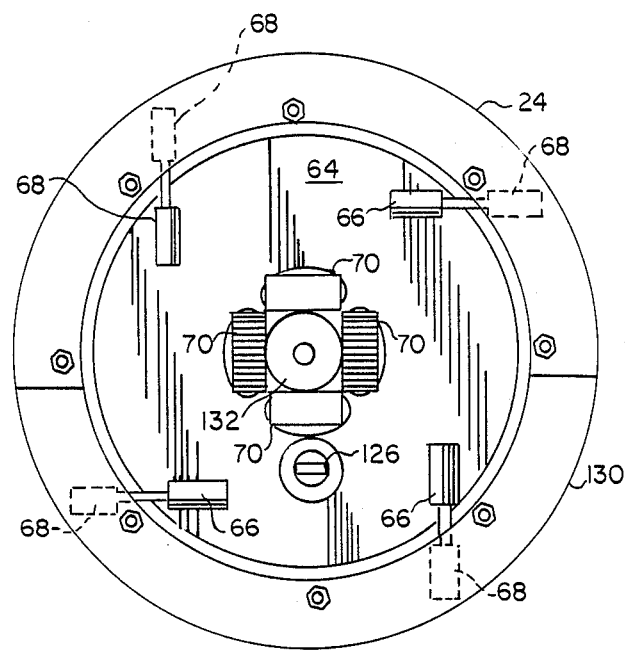
FIG. 5 is a sectional view taken along section lines 5—5 of FIG. 1 and illustrating another propulsion stage.

With reference to FIGS. 5 and 6, a drive shaft 44, which can be of cast iron, steel, or other alloy material, is journaled in bearings 46 in the center of front and rear end plates 12 and 14, and has a working end (not shown) for appropriate connection of a coupling, pulley or other means of using the rotational mechanical energy produced for work.

Figure 3:
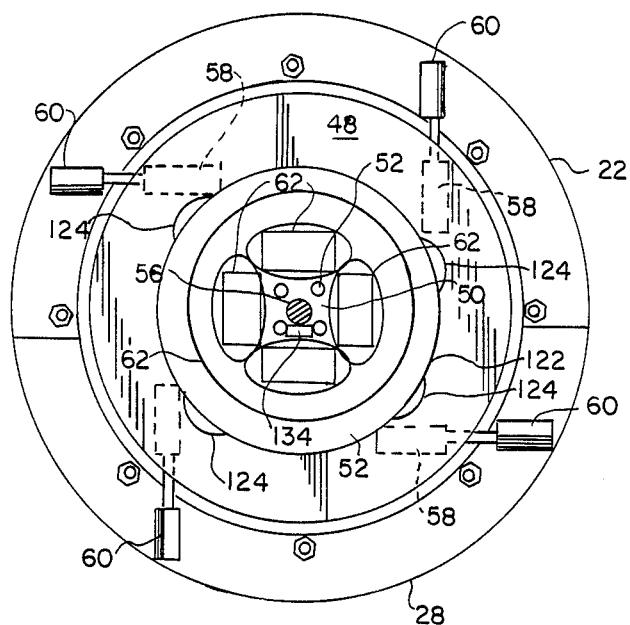
FIG. 3 is a sectional view along section lines 3—3 of FIG. 1, showing one stage of the propulsion plant.
Figure 4:
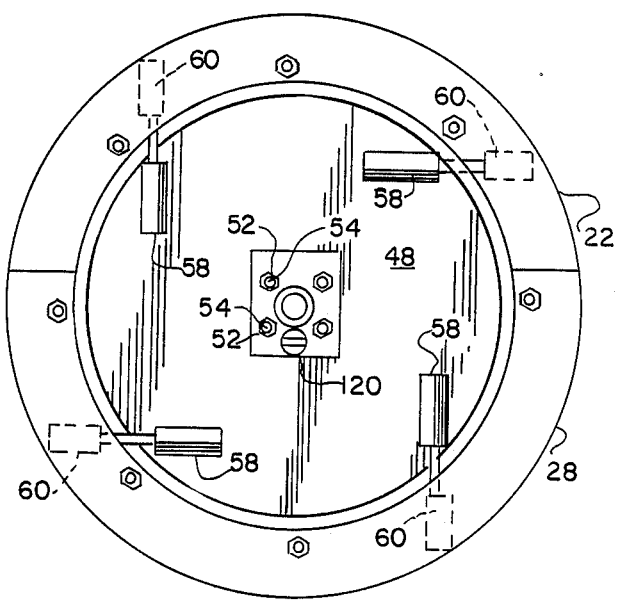
FIG. 4 is a sectional view along section lines 4—4 of FIG. 1 and illustrating the opposite side of the propulsion stage shown in FIG. 3.

Drive shaft 44 carries a first driven stage 48 or turbine, shown more clearly in FIGS. 3 and 4, which is fixed to drive shaft 44 by hub assembly 50, including hub assembly bolts 52 and nuts 54 which can be greater or lesser in number but which are fixedly attached to first driven stage 48. The hub assembly is keyed to drive shaft 44 by Woodruff key 56 or other suitable means of assuring that rotation of the first driven stage 48 will rotate, in the same manner, drive shaft 44.

Driven stage 48 is generally in register with frame members 22 and 28 and carries dynamically balanced magnetic driven elements 58 (shown in phantom). These magnetic driven elements 58 can be selected from electromagnets or permanent magnets of various types. If magnetic driven elements 58 are electromagnets, they maintain the same polarity and are electrically connected to power source 59 as described below. Magnetic driven elements 58 ar driven by corresponding electromagnetic drive means 60 arranged about and firmly attached to frame members 22 and 28 so as to align with magnetic drive means 58. Actuation of the electromagnetic drive means 60 causes an attractive or repulsive magnetic flux or force field which acts on the field generated by magnetic drive means 58 to either repel or attract it which turns the driven stage 48 and through means of hub assembly 50 likewise drive shaft 44. The electromagnetic drive means 60 are energized and polarized so that the appropriate magnetic force is applied to initiate and sustain rotation of driven stage 48 and drive shaft 44, thus converting the electric energy supplied to electromagnetic drive means 60 to useful mechanical work and acting as a motor. For clarity and simplicity, FIG. 1 does not show magnetic driven elements 58. Also, dynamically balanced and carried on fixed driven stage 48 are field coils 62 (shown schematically) which are electrically connected to provide a magnetic field.

Referring to FIGS. 1 and 5, a bearing-mounted driven stage 64 is carried on drive shaft 44 and is generally in register with upper frame member 24 and lower frame member 30 (bearings not shown). Driven stage 64 is free to rotate and has dynamically balanced magnetic driven elements 66 which align with electromagnetic drive means 68, similarly to those shown in FIGS. 3 and 4. However, magnetically driven elements 66 and electromagnetic drive means 68 are oriented, energized and polarized to drive or rotate bearing mounted driven stage 64 in a direction opposite to that of fixed driven stage 48. This counterrotation is important because bearing mounted driven stage carries dynamically balanced armatures 70 on front and back which during rotation cross the magnetic field set up by field coils 62 and induce current flow in the windings (not shown) of armatures 70. Thus, the power source 59 is used to additionally supply another source of electrical energy, either simultaneously with or separately from the mechanical energy supplied with the magnetic propulsion power plant of my invention.

Another fixed driven stage 72, similar in all respects to fixed driven stage 48, carried on drive shaft 44 and generally in register with upper frame member 26 and lower frame member 32, with appropriately placed additional magnetic driven elements 58, dynamically balanced and aligned with additional electromagnetic drive means 60, carries additional field coils 62 which are electrically connected and induce current in the armatures 70 carried on the back of bearing mounted driven stage 64. The use of front and rear generating systems on and counterrotation of bearing mounted driven stage 64 allows greater electrical current generating capacity than rotating fixed driven stages 48 and 72 past static armatures.

FIG. 6 shows the rear end plate 14 with rear support members 36 attached to bolts 16 and held in position securely by nuts 18. The lower end of rear support members 36 are attached to base support member 40. The electrical output post 74 and connector nut 76 which is separated from rear end plate 14 by insulator 78 are suitably connected to the armatures 70 as described below.

The electrical input and output circuits are described in connection with FIGS. 1-6, as indicated. Power source 59, preferably a battery having positive and negative posts 80 and 82, respectively, is connected by conductors to a circuit breaker box 84 containing all of the magnetic propulsion plant circuit breakers or fuses, as appropriate. Unless absolutely necessary for complete description or illustration, wiring for the various electrical connections is not shown in the drawings so that the Figures are uncluttered and clear. It is within the skill of practitioners of the art to which my invention pertains to envision such wiring or make the connections indicated herein or alternative hereto without undue difficulty or experimentation. The main circuit breaker (not shown) in circuit breaker box 84 is connected to the instrument panel 86 attached to front end plate 12 by brackets 88, and particularly to main power switch 90. Instrument panel 86 also carries various gauges and switches including input ammeter 92 and output ammeter 94, tachometer 95 for measuring the rotational speed of any of the driven stages 48, 64 and 72 by the use of two-way switch 98, since stages 48 and 72 are both fixed to drive shaft 44 and have the same speed. Voltmeter 100 is switchable by switch 102 to read input or output voltage. Potentiometer 104 is connected to increase or decrease the voltage of the timing and firing assembly 106 (shown more clearly in FIG. 6) for fixed driven stages 48 and 72. Potentiometer 108 is also connected to timing and firing assembly 106 and serves to adjust (increase or decrease) the voltage, and hence the speed, of bearing mounted stage 64.

Main power switch 90 is connected to energizing solenoid 110 and then to voltage connector post 112 separated from front end plate 12 by insulator 114. Voltage connector post 112 is connected through front end plate 12 to slip ring 116 which is separated from the back side of front end plate 12 by insulator 118. Slip ring 116 contacts and is ridden by brush 120 which is appropriately connected to magnetic driven elements 58 and field coils 62 on fixed driven stage 48. Further, the input circuit is then connected to large slip ring 122 on the back of fixed driven stage 48 and is insulated therefrom by insulators 124. Brush assembly 126 on bearing mounted driven stage 64 picks up current from large slip ring 122 and transfers it to magnetic driven elements 66. A similar brush assembly (not shown) mounted on the back of bearing mounted driven stage 64 and balanced against brush assembly 126 transfers electrical power to a large slip ring 128 mounted on insulators 130 on fixed driven stage 72 to power the field coils 62 and magnetic driven elements 60 before being grounded and completing the input circuit.

The input circuit also proceeds from the starting solenoid via circuit breaker box 84 through a timing and firing assembly 106 which fires the electromagnetic drive means 60 on frame members 22 and 28 and on frame members 26 and 32, and electromagnetic drive means 68 on frame members 24 and 30 in a sequence and with a polarity to initiate and sustain rotation of fixed driven stages 48 and 72 and bearing mounted driven stage 64, respectively. Firing and timing assembly 106 includes four individual firing circuit boxes 130, one of which might be a spare since only three stages are involved or might be used to fire additional electromagnetic drive means on one of the frame members. The timing mechanism can be any conventional or adaptable timing mechanism such as cam operated breaker points or an infrared or photoelectric system as desired.

The output circuit begins on bearing mounted driven stage 64 with armatures 70 and includes a connection to a central slip ring 132 and brush assembly 134 to ground. On the back of bearing mounted driven stage 64, another slip ring (not shown) allows a brush assembly 134, similar to that of FIG. 3, to transfer output power to the front of fixed driven stage 72 and to another brush assembly 136 on the back of fixed driven stage 72 to a central slip ring 138 mounted with an insulating ring 140 to rear end plate 14. Central slip ring 138 is connected to output voltage post 74. From this point, any necessary or desired converting or rectifying operation can be carried out to attain the desired electrical output by known and conventional equipment not shown.

As indicated above, the simultaneous provision of mechanical and electrical outputs, which can be used together or separately, from a single power source, and the counterrotation of armatures past the fields set up in adjacent rotating stages allowing greater output than indicated from the speed of the stage rotation are features of my invention which render it advantageous in use.

From the Figures of the drawings, various alternatives could be readily envisioned with the result of improvements in my invention within the scope and spirit thereof. For example, the use of permanent magnets as the magnetic driven elements decreases the power required to initiate and sustain rotation. Further, the use of additional electromagnetic drive means spaced about the frame members would increase the driving power of my invention and smooth out the driving force applied. Polarity reversals with appropriate timing would allow the electromagnetic drive means to pull a magnetic driven element towards it and as it aligned therewith another polarity reversal would repel or drive it away, thus increasing the rotary angle through which power could be applied.

Having described my invention illustratively, it is desired that it be limited only by the lawful scope of the following claims:

1. A magnetically powered motor providing both mechanical and electrical power output which comprises in combination
    (a) housing means including a front cover means and a back cover means, both of said cover means having centrally located bearing means and having connecting members which connect said cover means;
    (b) at least two peripharal frame members between said cover means and attached to said connecting members, said frame members each having at least one electromagnetic drive means located thereon;
    (c) a DC power source electrically connected to said electromagnetic drive means;
    (d) a drive shaft bearing mounted in said bearing means and extending between said front and said back cover means and outwardly of one of said cover means;
    (e) at least one electromagnetically driven stage fixedly attached to said drive shaft for rotation thereof about the central longitudinal axis of said drive shaft and in registry with one of said at least two peripheral frame members, said fixed stage having at least one dynamically balanced magnetic element located adjacent the periphery of said fixed stage and in proximate driven relation to said electromagnetic drive means during the rotation of said fixed stage, at least one dynamically balanced electromagnetic field generating coil means adjacent said central axis and electrically connected to said power source;

(f) at least one electromagnetically driven stage bearing mounted on said drive shaft for rotation thereof about said central axis and in registry with the other of said at least two frame members, said bearing mounted driven stage having at least one dynamically balanced magnetic element located adjacent the periphery of said bearing-mounted stage and in proximate driven relation to said electromagnetic drive means for being driven in counter rotation to the rotation of said fixed stage, and at least one dynamically balanced armature means adjacent said central axis and electrically connected to a suitable receiver for electrical power generated in said armature; and (g) a timing and polarity selection assembly electrically connected to said DC power source and said electromagnetic drive means, so that activation of said timing and polarity selection assembly energizes said electromagnetic drive means in the sequence and with the polarity required to initiate and sustain rotation of said fixed stage and counterrotation of said bearing mounted stage and provide thereby for the simultaneous rotation of said drive shaft for mechanical power and for electrical power at a level twice that expected from the rotational speed of said fixed and said bearing mounted stages.

2. The motor of claim 1 wherein said frame members have upper and lower halves.

3. The motor of claim 1 wherein said at least one electromagnetic drive means is a electromagnet capable of switching polarity.

4. The motor of claim 3 in which each frame member has four substantially equally spaced apart electromagnets about said frame member.

5. The motor of claim 4 wherein said electromagnet on the second and any subsequent frame members are rotationally offset from those of other frame members so that the driving force is smoothed out.

6. The motor of claim 1 wherein said DC power source is a battery.

7. The motor of claim 1 wherein said magnetic elements of said fixed and said bearing mounted driven stages are selected from electromagnets and permanent magnets.

8. The motor of claim 7 wherein said magnetic elements are electromagnets.

9. The motor of claim 8 wherein said electromagnets are electrically connected to said DC power source.

10. The motor of claim 9 wherein said electromagnets and said coil means are connected in parallel to said DC power source.

11. The motor of claim 10 wherein said electrical connection is carried out by a brush and slip ring configuration.

12. The motor of claim 1 wherein said motor has three of said frame members and two of said fixed driven stages with a single counterstating bearing mounted driven stage therebetween each of said driven stages in registry with a frame member.

13. The motor of claim 12 wherein each of said frame members has four electromagnetic drive means substantially equally spaced apart and adjacent said driven stage in register therewith.

14. The motor of claim 13 wherein said magnetic elements of said driven stages are selected from electromagnets and permanent magnets.

15. The motor of claim 14 wherein said magnetic elements are electromagnets.

16. The motor of claim 15 wherein said electromagnets and said coil means of said driven stages are electrically connected in parallel to said power source by a brush and slip ring means.

17. The motor of claim 12 wherein said bearing mounted driven means has four dynamically balanced armature means connected in series and substantially equally spaced about said central axis.

18. The motor of claim 17 wherein said armature means are connected to said connector for electrical take off by a brush and slip ring means.

* * * * *